United States Patent
Trinh et al.

(10) Patent No.: US 10,741,330 B1
(45) Date of Patent: *Aug. 11, 2020

(54) HIGH VOLTAGE FRINGE-EFFECT CAPACITOR

(71) Applicant: Presidio Components. Inc., San Diego, CA (US)

(72) Inventors: Hung Van Trinh, La Jolla, CA (US); Alan Devoe, La Jolla, CA (US)

(73) Assignee: Presidio Components. Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,991

(22) Filed: Apr. 2, 2019

Related U.S. Application Data

(62) Division of application No. 15/728,120, filed on Oct. 9, 2017, now Pat. No. 10,262,803, which is a division of application No. 12/965,557, filed on Dec. 10, 2010, now Pat. No. 9,786,437.

(51) Int. Cl.
*H01G 4/35* (2006.01)
*H01G 4/005* (2006.01)
*H01G 4/30* (2006.01)
*H01G 4/012* (2006.01)

(52) U.S. Cl.
CPC ............... *H01G 4/35* (2013.01); *H01G 4/005* (2013.01); *H01G 4/012* (2013.01); *H01G 4/30* (2013.01)

(58) Field of Classification Search
CPC ........... H01G 4/30; H01G 4/232; H01G 4/252
See application file for complete search history.

(56) References Cited

U.S. PATENT DOCUMENTS

| | | |
|---|---|---|
| 5,245,309 A | 9/1993 | Kawase et al. |
| 6,008,717 A | 12/1999 | Kawase et al. |
| 6,058,004 A | 5/2000 | Duva et al. |
| 6,068,547 A | 5/2000 | Lupi |
| 6,346,871 B1 | 2/2002 | Ogasawara et al. |
| 6,608,547 B1 | 8/2003 | Greier et al. |
| 6,619,763 B2 | 9/2003 | Trinh et al. |
| 6,661,638 B2 | 12/2003 | Jackson et al. |
| 6,816,356 B2 | 11/2004 | Devoe et al. |
| 9,786,437 B1 | 10/2017 | Trinh et al. |
| 10,262,803 B1 | 4/2019 | Trinh et al. |
| 2009/0133252 A1 | 5/2009 | Drapkin et al. |
| 2011/0002082 A1 | 1/2011 | Bultitude et al. |

*Primary Examiner* — Dion Ferguson
(74) *Attorney, Agent, or Firm* — Wood Herron & Evans LLP

(57) ABSTRACT

A multilayer chip capacitor includes electrodes comprised of numerous, closely spaced conductive layers. Adjacent conductive layers are essentially non-overlapping, so that fringe capacitance between opposing electrodes provides substantially all of the capacitance. The conductive layers may be shaped to form a non-planer boundary between electrodes. An additional high frequency integrated capacitor is formed from external electrode plates. The non-planar electrode boundary principle is also applied to discoidal capacitors in the form of a non-concentric electrode boundary.

15 Claims, 11 Drawing Sheets

HIGH VOLTAGE FRINGE-EFFECT CAPACITOR

RELATED APPLICATIONS

This application is a divisional of U.S. application Ser. No. 15/728,120 filed Oct. 10, 2017, which is a divisional of U.S. application Ser. No. 12/965,557 filed Dec. 10, 2010, now U.S. Pat. No. 9,786,437, both of which are hereby incorporated by reference herein in their entirety.

TECHNICAL FIELD

The present invention generally concerns high voltage capacitors. More particularly, the present invention concerns the configuration of the electrodes in a multilayer capacitor forming part of a high bandwidth, high voltage filter capacitor.

BACKGROUND

The present invention relates to the design of multilayer filter capacitors made of a dielectric material such as a ceramic dielectric material. A capacitor is an electronic component that stores electrical energy in the form of an electric field, and is commonly used for filtering and energy storage applications in electronic circuits. The electric field forms between electrically opposed electrodes when a voltage is applied to the capacitor terminals. An ideal capacitor is characterized by the equation:

$$i = C \times dv(t)/dt$$

where i is the current flowing through the capacitor, C is the capacitance of the capacitor in farads, and v(t) is the voltage across the capacitor with respect to time.

Because the current flowing through a capacitor depends on the rate at which the voltage across its terminals changes (i.e. the value of dv(t)/dt), the impedance of a capacitor varies inversely with frequency. This makes capacitors useful as signal filters. Realizable capacitors deviate from this ideal relationship due to series resistance and series inductance, which are unavoidable byproducts of the physical configuration of the capacitor as well as the properties of the materials used to make the capacitor. At lower frequencies, the impedance of a filter capacitor is dominated by the capacitive element. However, as operational frequencies increase, the equivalent series resistance and equivalent series inductance begin to dominate the device impedance, which limits useful bandwidth of the capacitor.

One type of capacitor in common use is a multilayer capacitor. A multilayer capacitor is configured with multiple conducting plates separated from each other by layers of dielectric material. A type of multilayer capacitor commonly available is configured so that metal plate regions of alternating polarity are stacked in such a way that the metal plate regions are in a parallel relationship and at least partially overlap each other, with the overlapping regions providing capacitance in a manner that may be modeled as a capacitor with two parallel plate electrodes. The capacitance of the conventional overlapping parallel-plate capacitor is approximated by the formula:

$$C = kA/d$$

where C is the capacitance in farads, k is the dielectric constant in farads per meter, A is the area of electrode overlap in square meters, and d is the distance of separation between plates in meters. To obtain the minimal physical size for a capacitor with a given capacitance, it is desirable to minimize d to increase capacitance per unit volume. However, there is a minimum value of d which will allow the capacitor to operate at its rated voltage without the dielectric breaking down. Conversely, as the required operating voltage of the capacitor increases, d must also increase. Typically, this causes the maximum capacitance achievable within a fixed capacitor package size to drop in roughly inverse proportion to the square of the maximum rated voltage of the capacitor.

FIGS. 1A and 1B give an example of a known multilayer, discoidal, feed-through type ceramic filter capacitor 1 of the type previously described. The capacitor 1 has a central hole, or bore, that includes a first conductive metal surface forming an inner terminal 11, and external rim surface, or circumference, which includes a second conductive metal surface forming an outer terminal 12. The capacitor 1 is substantially comprised of multiple ceramic layers 13x that form a ceramic laminate body 13. Between the layers 13x are a number of ring-shaped first metalized areas, or electrode plates 14x, that collectively form a first electrode 14, and a number of ring-shaped second metalized areas, or electrode plates 15x, that collectively form a second electrode 15.

A typical discoidal feed-through capacitor 1 may have an external diameter D of about 0.105 inch ("in.") or 105 mils; an internal diameter d of about 35 mils; and the overall thickness T of about 65 mils. Further, a typical ceramic dielectric has a voltage rating of about 100 volts per mil (0.001 in) of thickness, so if the capacitor 1 is designed to have a voltage rating of about 1000 volts, it will require a ceramic dielectric thickness tin the axial direction between adjacent electrode plates 14x, 15x of about 10 mils. Because a voltage breakdown is more likely to occur along the imperfections in the seams 16 between layers 13x than through layers 13x, the radial separation d1 between electrode plates 14x, 15x and the external metallization layers forming the capacitor terminals 11, 12 should be at least 50% greater than the plate separation in the axial direction across the layers 13x. Thus, the distance d1 for the capacitor 1 should be about 15 mils.

The internal design of the capacitor 1 is shown in FIG. 1B, which presents a cross-sectional view. As discussed, the thickness t of the dielectric is 10 mils layer-to-layer, with an end margin d1 between electrodes 14, 15 and capacitor terminals 11, 12 of 15 mils. The top and bottom ceramic cover layers are typically 7.5 mils thick, resulting in an overall thickness of the laminate body 13 of about 65 mils. Given a desired electrode separation of 10 mils, this allows three internal electrode plates 14x, 15x of each polarity, giving five active electrostatic field regions with a total overlapping area A (i.e.—effective electrode area) of 0.005498 sq. in., or $5 \times \pi \times ((0.0375 \text{ in})^2 - (0.0325 \text{ in})^2)$.

FIGS. 2A and 2B give an example of a known multilayer, discoidal, feed-through type ceramic filter capacitor 2 disclosed in U.S. Pat. No. 6,619,763 (issued Sep. 16, 2003), which is incorporated herein by reference. Capacitor 2 relies on the fringe-effect capacitance between non-overlapping electrodes rather than the parallel plate capacitance between overlapping electrodes as in capacitor 1. Although not shown here, for a capacitor 2 having substantially identical outer physical dimensions as capacitor 1, the number of electrode plates 24x, 25x is typically much greater than the number of electrode plates 14x, 15x in capacitor 1. Since the axially adjacent electrodes plates 24x are all attached to the outer capacitor terminal 27, and the axially adjacent electrode plates 25x are all attached to the inner capacitor terminal 26, the electric field across the dielectric layers 23x between the electrode plates 24x, 25x in the axial direction is greatly reduced. This allows adjacent electrodes 24x, 25x to be stacked more closely than in capacitor 1, resulting in an increased number of relatively thinner ceramic layers 23x, which comprise the laminate body 23. The result is that the combined plates 24x and 25x act as nearly continuous, axially extending electrodes 24, 25 respectively. The effective electrode area (A) of the capacitor is thus approximated by the area of the electrically active surface the inner electrode 25, which is h×2πxr, where h is the height of the electrode stack and r is the radius of the vertical surface of inner electrode 25. Using similar design parameters as in the previous example results in capacitor 2 having an effective electrode area of 0.009503 sq. in., or (0.055 in)×2π×(0.0275 in), which is nearly twice the effective electrode area of capacitor 1.

FIG. 2C shows a cross-sectional view of another known multilayer discoidal feed-through capacitor 3 disclosed in U.S. Pat. No. 6,619,763 Like capacitor 2, capacitor 3 relies on fringe-effect capacitance between non-overlapping electrodes. However, in capacitor 3 opposing plates 34x, 35x are positioned on alternating dielectric layer 23x laminate seams 28x. In capacitor 2, the seams 28x between dielectric layers 23x of the laminate body 23 extend between the electrode plates 24x, 25x. Due to imperfections in the lamination boundary forming seam 28x, a voltage breakdown path along a seam 28x typically occurs at relatively lower electrostatic field strength than a path that passes through a dielectric layer 23x. Therefore, the voltage rating of capacitor 2 is typically limited by a voltage breakdown that occurs between opposing electrode plates 24x, 25x along the seams 28x. Referring to FIG. 2C, the capacitor 3 has opposite polarity electrode plates 34x, 35x on alternating dielectric layers 23x of the laminate body 23. Capacitor 3 thus requires that a voltage breakdown path pass through a dielectric layer 23x to allow an arc 39 between opposite polarity electrode plates 34x, 35x. Such a failure path typically requires a substantially higher voltage than a path along a seam 28x for similarly spaced electrode plates. Capacitor 3 therefore typically offers increased breakdown voltage without significantly altering the effective electrode area.

FIGS. 3A and 3B give an example of a known multilayer ceramic chip capacitor 4. The capacitor 4 is formed essentially in the shape of a parallelepiped so that it will lay flat on a circuit board and to facilitate automated circuit board assembly. Capacitor 4 includes capacitor terminals 41, 42 and is substantially comprised of multiple ceramic layers 43x that form a ceramic laminate body 43. Between the layers 43x are a number of first metalized areas, or electrode plates, 44x that collectively form a first electrode 44, and a number of second metalized areas, or electrode plates, 45x that collectively form a second electrode 45. The parallel plates 44x, 45x are connected by the metalized layers on the ends of the laminate body 43 that form the capacitor terminals 41, 42. Multilayer chip capacitors come in numerous sizes, with smaller packages being developed on an ongoing basis. Typical chips available today may range in size from 10 mils long by 5 mils wide (commonly referred to in the industry as a 01005 size capacitor), to 500 mils long by 300 mils wide (or 5030 size capacitor) and beyond, with larger sized chips typically allowing for a higher capacitance at any given voltage rating. One example of a typical surface mount ceramic chip capacitor 4 may have an external length L of about 80 mils; an external width W of 50 mils; and the overall thickness T of 30 mils. Using the same design parameters as with the discoidal capacitor 1 in FIGS. 1A-1B, a multilayer chip capacitor 4 designed to have a rated voltage of 1000 volts will require a ceramic dielectric thickness t between adjacent plates 44x, 45x of about 10 mils. Likewise, the longitudinal separation d1 between electrode plates 44x, 45x and the terminals 41, 42 will be about 15 mils. Top and bottom ceramic cover layers are typically 5 mils thick, resulting in an overall thickness of the laminate body 43 for the capacitor 4 with three total electrode plates 44x, 45x, of about 30 mils. Two active electrostatic field regions result in an overlapping area A (i.e.—effective electrode area) of 0.005 sq. in., or 2×(0.08-0.03)×0.05 in., which is about 90% of the electrode surface area as in capacitor 1.

Because of the 15 mil horizontal spacing required to maintain the 1000 volt rating in our example, if the dimensions of capacitor 3 are reduced to an external length L of about 60 mils; an external width W of about 30 mils; and keeping the overall thickness T of about 30 mils (known in the industry as a 0603 sized capacitor), the electrode area shrinks to about 0.0018 sq. in., or 2×(0.06-0.03)×0.03 in., which is only 33% of the electrode surface area as in capacitor 1. As can be seen, because of the required electrode spacing, it becomes very difficult to maintain high voltage ratings with conventional designs in a multilayer chip capacitor as the exterior dimensions shrink.

High voltage capacitors have multiple applications, but are of particular use in filtering electrical signals on the wires and leads of implanted cardiac pacemakers and cardiac defibrillators. Cardiac defibrillators in particular use high voltages, commonly about 750 volts. When the electrodes of a filter capacitor are subjected to these high voltages, which with safety margins may be thousands of volts, capacitors having partially overlapping electrode plates are subject to developing voltage breakdown paths. Such paths can occur between adjacent plates through the ceramic, or to oppositely-charged regions of the outside surface of the capacitor where electrical connections are made. Due to the large electrode plate separations required to prevent this voltage breakdown, high voltage capacitors having high capacitive values are difficult to produce in a small form factor, particularly in the case of multilayer chip capacitors. Discoidal feed-through capacitors, on the other hand, have been found to be prone to cracking when used in implanted cardiac pacemakers because the metal wire travels though the center of the capacitor. Discoidal feed-through capacitors also have an inconvenient form factor as compared to chip capacitors. Thus, medical device manufactures in particular have a need for chip capacitors having high voltage ratings coupled with capacitances at least as high as existing discoidal feed-through capacitors.

Accordingly, there is a need for improved multilayer chip capacitors of substantially the same size as currently available, as well as in smaller packages, that provide greater capacitance while at the same time having substantially higher breakdown voltages. At the same time, there is a need for these same capacitors to have lower series resistances and inductances so as to provide better filtering of the high frequency interferences frequently encountered in our modern wireless world.

SUMMARY OF THE INVENTION

The present invention provides multilayer capacitors with higher breakdown voltages and capacitance values than known capacitors having comparable size and form factors.

In one embodiment of the invention, a multilayer chip capacitor includes electrodes comprised of numerous, closely spaced conductive layers within a dielectric laminate. The conductive layers are configured in such a way that the multilayer chip capacitor obtains substantially all of its capacitance from fringe capacitance between opposing electrodes. This construction allows for higher breakdown voltages and capacitor values in a smaller physical package.

In another embodiment of the invention, the conductive layers of a multilayer chip capacitor are configured so that the gap between electrodes of opposite polarity traverses the dielectric laminate body in such a way so as to form a non-planer boundary between electrodes. This may increase the effective surface area of the electrodes, which in turn may increase the capacitance of the capacitor.

In another embodiment of the invention, the width of the electrode gap varies at different points along the non-planar boundary between electrodes.

In another embodiment of the invention, an additional high frequency integrated capacitor is formed from external electrode plates, which increases both the overall capacitance and the operational bandwidth of a multilayer chip capacitor.

In another embodiment of the invention, the non-planar electrode gap principle is applied to discoidal feed-through capacitors, increasing their capacitance as compared to other known discoidal feed-through capacitors.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 3A:
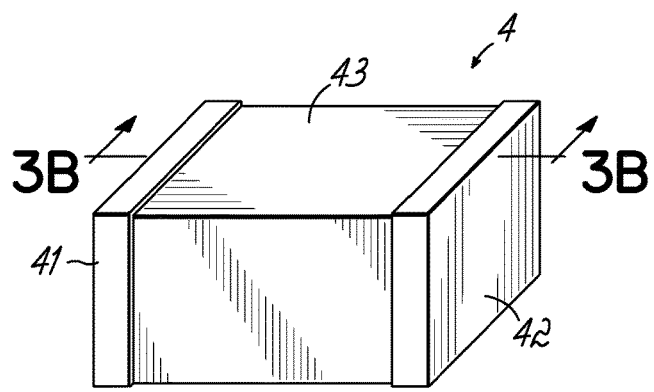
FIG. 3A is a diagrammatic perspective view showing a known laminated multilayer ceramic chip capacitor.
Figure 3B:
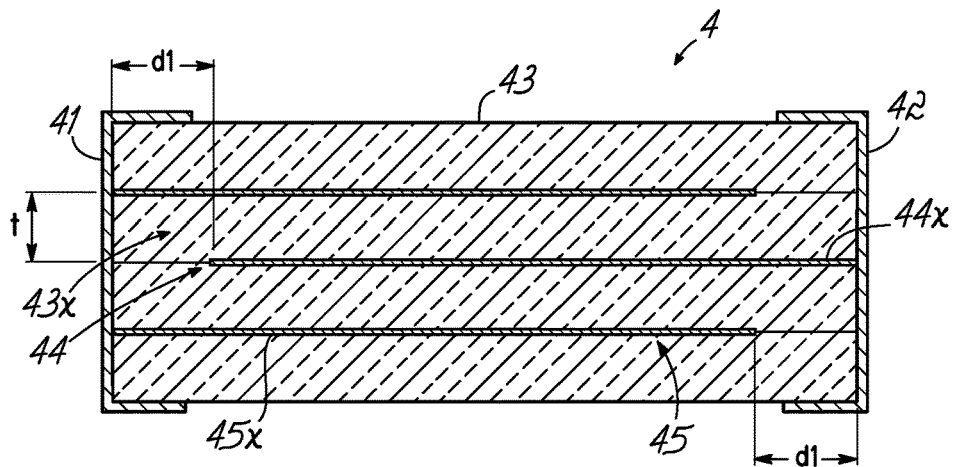
FIG. 3B is a centerline cross-sectional view taken along line 3B-3 B of FIG. 3A illustrating the internal electrode structure of the laminated multilayer ceramic chip capacitor of FIG. 3A.

Turning to the drawings of the embodiments of the invention, wherein like numbers denote like parts throughout the several views, FIGS. 4A-4E are diagrams showing multiple embodiments of the invention where non-overlapping electrodes are used to form multilayer chip capacitors 5, 6. Fringe-effect capacitance is a term used to describe capacitance attributable to the electrostatic fields that build up at the edge of electrode plates. Fringe-effect capacitance is always present between the edge of an electrode plate and a conductor having an opposite polarity. An example of a fringe-effect capacitance is the capacitance that may exist between the far ends of electrode plates $44x$, $45x$ and their respective opposing electrically conductive terminals 42, 41 in FIG. 3B. Fringe-effect capacitance accounts for only a fraction of the capacitance of the standard multilayer chip capacitor 4 because of the high aspect ratio of electrode plate $44x$, $45x$ length to dielectric layer $43x$ thickness. In contrast, the multilayer capacitor construction employing non-overlapping electrode plates $54x$, $55x$ of capacitor 5 shown in FIG. 4D depends almost entirely on fringe-effect capacitance. With sufficiently numerous electrode plates $54x$, $55x$, the fringe-effect electric field lines emanating from the opposing edges of the electrode plates $54x$, $55x$ begin to approximate the electric field lines found between the parallel plates of an ideal capacitor. The capacitance of capacitor 5 may thus be calculated using the area of the two effective electrodes 54, 55 represented by the cross-sectional area of the laminate body 53.

Figure 4A:
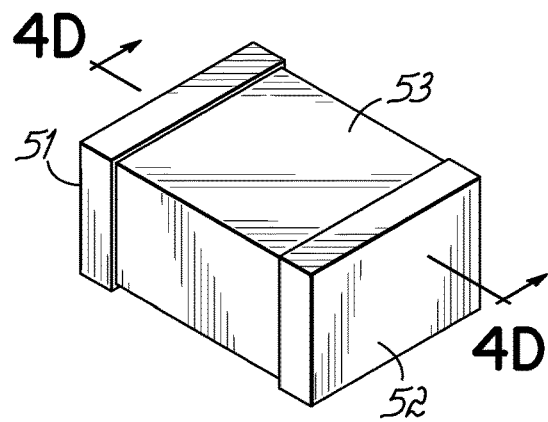
FIG. 4A is a diagrammatic perspective view showing an embodiment of a multilayer chip capacitor employing a non-overlapping electrode structure.
Figure 4B:
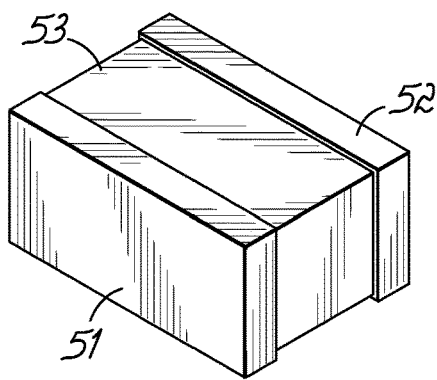
FIG. 4B is a diagrammatic perspective view showing an alternative embodiment of a multilayer chip capacitor in FIG. 4A with capacitor terminals along the length and height of the capacitor.
Figure 4C:
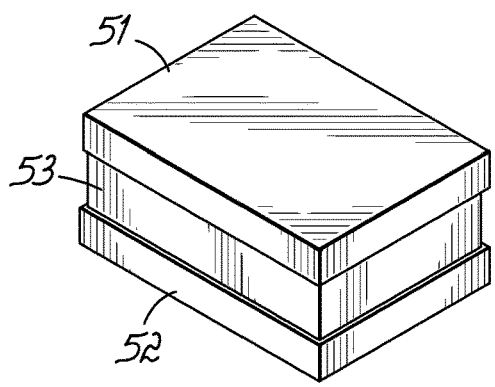
FIG. 4C is a diagrammatic perspective view showing an alternative embodiment of a multilayer chip capacitor in FIG. 4A with capacitor terminals along the length and width of the capacitor.

For the purposes of a subset of the several embodiments of the invention, the external dimensions of capacitors 5, 6 shown in FIGS. 4A-4E may be substantially identical to that of a 0603 sized capacitor (a perspective view of which is presented in FIG. 4A), or a 0306 sized capacitor (a perspective view of which is presented in FIG. 4B). As can be seen, a 0306 package has essentially the same dimensions as an 0603 package, but with the length and width swapped. More specifically, in the case of an 0603 package, capacitors 5, 6 may have an external length L of about 60 mils; an external width W of about 30 mils; and an overall thickness T of about 30 mils; while a 0306 package may have an external length L of about 30 mils; an external width W of about 60 mils; and an overall thickness T of about 30 mils. For capacitors having external dimensions where the width is different than the thickness, such as an 0306 package having a thickness of 20 mils, electrically conductive terminals 51, 52 also may be located on the side of the capacitor defined by the length and width, shown as the top and bottom sides of the capacitor illustrated in FIG. 4C.

Figure 4D:
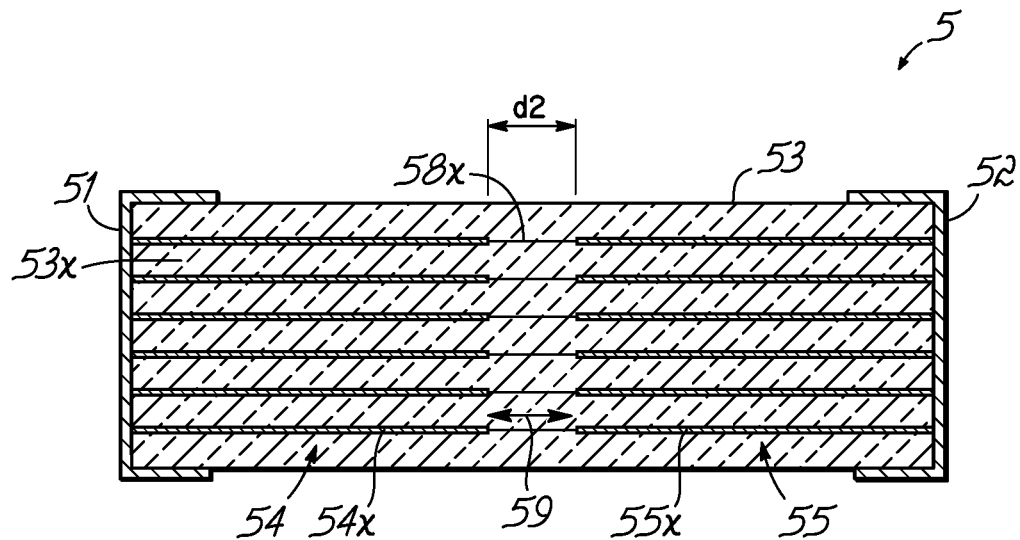
FIG. 4D is a centerline cross-sectional view taken along line 4 C-4 C. of FIG. 4A illustrating the internal electrode structure of an embodiment of the multilayer chip capacitor of FIGS. 4A-4B.

With reference to FIG. 4D, the non-overlapping multilayer chip capacitor 5 may include multiple layers $53x$ of a dielectric material, which may be a ceramic material. Deposed between the dielectric layers $53x$ may be a number of first metalized areas, or electrode plates $54x$, that collectively form a first electrode 54, and a number of second metalized areas, or electrode plates $55x$, that collectively form a second electrode 55. Because the electrode plates $54x$, $55x$ from opposing electrodes 54, 55 do not overlap, capacitor 5 may rely almost entirely on fringe-effect capacitance between the non-overlapping electrode plates $54x$, $55x$ to store electric charge. The electrode plates $54x$, $55x$ may be electrically connected by the electrically conductive terminals 51, 52 on the outer edges of the laminate body 53, which may also facilitate external electrical connections to the capacitor 5.

The number of electrode plates $54x$, $55x$ forming each electrode 54, 55 in capacitor 5 may be substantially greater than the number of electrode plates $44x$, $45x$ in capacitor 4. The increased number of electrode plates $54x$, $55x$ may be possible because electrode plates $54x$, $55x$ from opposing electrodes 54, 55 do not overlap. Thus, under normal operating conditions, there will be little or no electrostatic field between the vertically adjacent plates. This allows the electrode plates $54x$, $55x$ to be advantageously placed as closely as is practical in the vertical direction, allowing an increased number of relatively thinner dielectric layers $53x$. Because of the number and spacing of the electrode plates $54x$, $55x$, electrodes 54, 55 may behave as a continuous vertical parallel plate electrodes with a gap 59 of length d2. In one embodiment of the invention, there may be about 30 parallel electrode plates $54x$, $55x$, with dielectric layers $53x$ each having a thickness of about 1 mil.

Figure 4E:
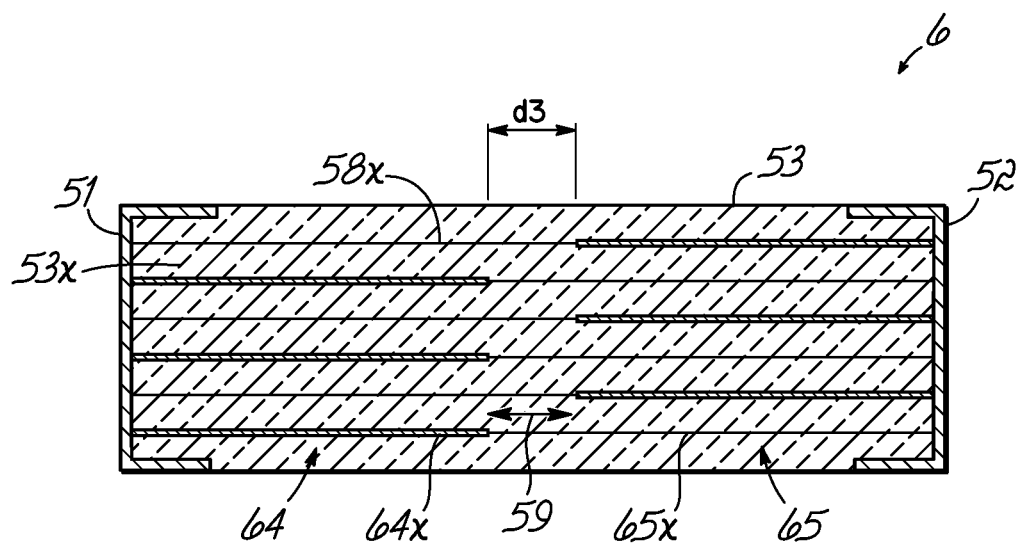
FIG. 4E is another centerline cross-sectional view illustrating an alternative internal electrode structure for the multilayer chip capacitor of FIGS. 4A-4B.

With reference to FIG. 4E, capacitor 6 is an alternate embodiment of the invention configured to have opposite polarity electrode plates $64x$, $65x$ only on alternating dielectric layer $53x$ laminate seams $58x$. In the embodiment shown in FIG. 4D, the seams $58x$ between dielectric layers $53x$ of the laminate body 53 extend between the electrode plates $54x$, $55x$. A voltage breakdown path between electrodes 54, 55 may thus occur along seams $58x$ at relatively lower electrostatic field strengths due to imperfections in the laminate boundary as compared to a voltage breakdown path that must pass vertically through a dielectric layer $53x$. Therefore, the voltage rating of capacitor 5 as shown in FIG. 4D may be limited by voltage breakdown between opposing electrode plates $54x$, $55x$ along the seams $58x$. Referring now to FIG. 4E, capacitor 6 has electrode plates $64x$, $65x$ from opposing electrodes 64, 65 on alternating dielectric layers $53x$ of the dielectric body 53. Because a potential voltage breakdown path between electrode plates $54x$, $55x$ in capacitor 6 requires that the breakdown occur both in a horizontal direction along a seam $58x$, and in a vertical direction through a dielectric layer $53x$, such a failure path will typically require a substantially higher voltage than one that occurs only along a seam $58x$. Capacitor 6 may therefore offer an increased breakdown voltage without significantly altering the effective electrode area as compared to capacitor 5. Capacitor 6 may also allow closer horizontal spacing d3 of electrode plates $54x$, $55x$ than capacitor 5, resulting in a higher overall capacitance value for a given capacitor voltage rating.

For an exemplary embodiment based on 0603 dimensions, which may be represented by the orientation presented in FIG. 4A, the effective electrode area for capacitors 5, 6 with non-overlapping electrode plates $54x$, $55x$ may be about 0.0009 sq. in., or 0.03 in.×0.03 in. Alternatively, in a 0306 configuration, which may be represented by the orientation presented in FIG. 4B, terminals 51, 52 are located on the long side of the laminate body 53 of the capacitor 5, 6. The effective electrode area may thereby be increased to about 0.0018 sq. in., or 0.03 in.×0.06 in. In addition to increasing the effective electrode area, using a 0306 configuration may also reduce series resistance and series inductance due to a shorter and wider electrode plate 54x, 55x configuration in relation to the effective electrode area. It can be seen that unlike multilayer capacitors which rely on parallel plate capacitance between overlapping electrode plates, the effective electrode surface area for a non-overlapping multilayer chip capacitor does not typically depend on the horizontal length of the laminate body 53 between terminals 51, 52, but rather the height and width of the laminate body 53. Advantageously, this may allow the voltage rating and capacitance of the capacitor to be adjusted without affecting the effective electrode area by merely adjusting the length of the gap 59 between electrodes of opposite polarity. Although the previous example used 0603 and 0306 sized capacitors, it will be understood by a person having ordinary skill in the art that the embodiments of the invention contained herein apply equally to any size or orientation of multilayer capacitor.

FIGS. 5A-5J are diagrammatic top views of electrode plate shapes representing alternate embodiments of the invention. Because the effective electrode areas of capacitors 5, 6 have a vertical orientation, the effective electrode areas may be increased by altering the shape of the electrode plates 54x, 55x, 64x, 65x, to take advantage of the laminate body 53 length without reducing the breakdown voltage rating. For purposes of clarity, from here on, the reference numbers used to describe the capacitors embodied in FIGS. 5A-J are limited to those used to describe the elements of capacitor 5 in FIG. 4D. However, it is understood that the same embodiments apply equally to the alternating electrode plate arrangement in capacitor 6 as shown in FIG. 4E.

Figure 5A:
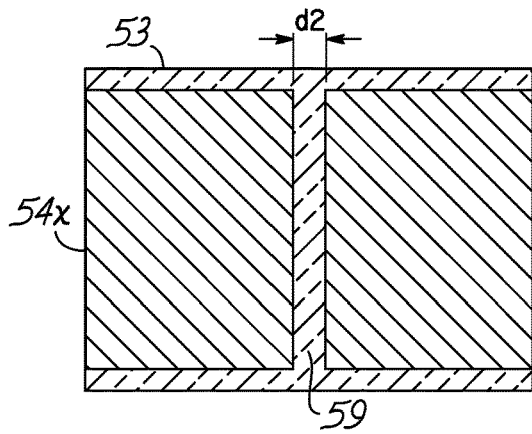
FIG. 5A is a diagrammatic top view of an electrode plate topology of embodiments of the multilayer capacitors in FIGS. 4A-4E.
Figure 5B:
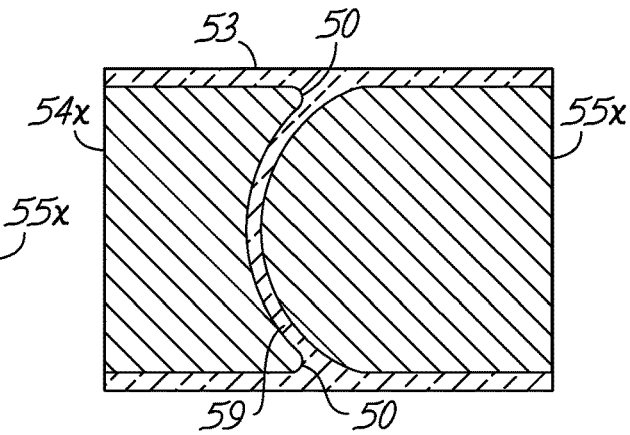
FIG. 5B is a diagrammatic top view of an electrode plate topology of alternative embodiments of the multilayer capacitors in FIGS. 4A-4E.
Figure 5C:
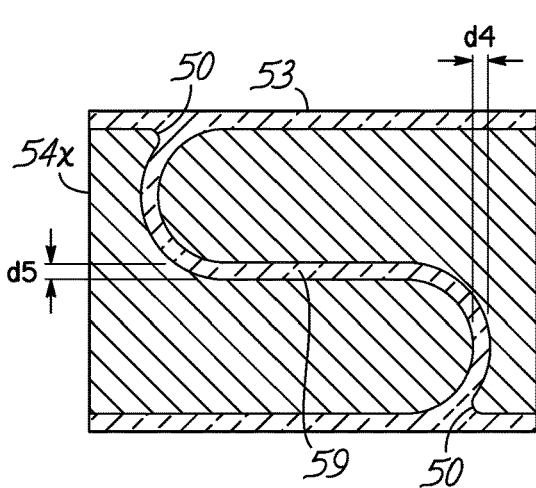
FIG. 5C is a diagrammatic top view of an electrode plate topology of alternative embodiments of the multilayer capacitors in FIGS. 4A-4E.
Figure 5D:
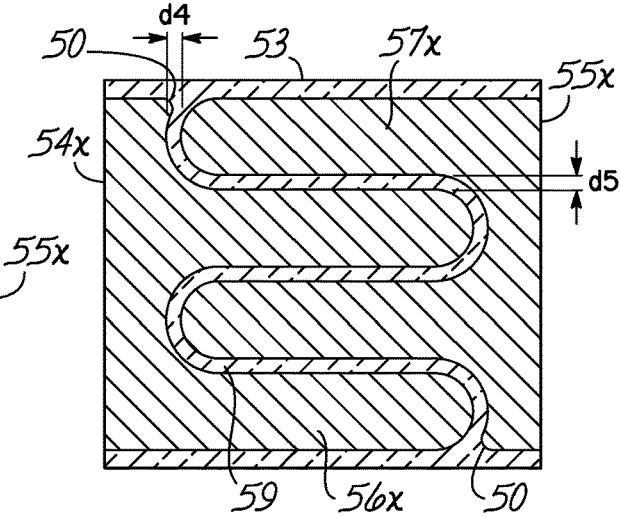
FIG. 5D is a diagrammatic top view of an electrode plate topology of alternative embodiments of the multilayer capacitors in FIGS. 4A-4E.
Figure 5E:
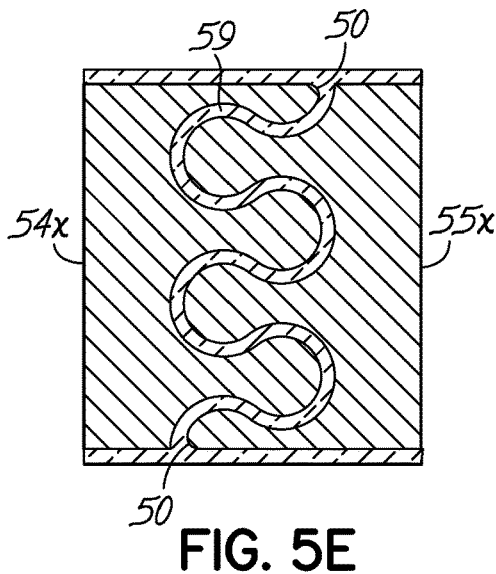
FIG. 5E is a diagrammatic top view of an electrode plate topology of alternative embodiments of the multilayer capacitors in FIGS. 4A-4E.
Figure 5F:
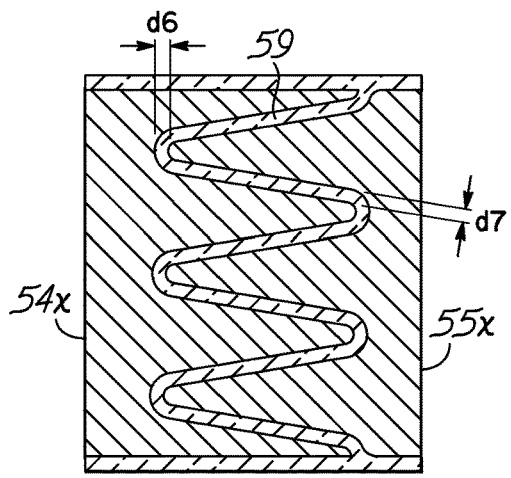
FIG. 5F is a diagrammatic top view of an electrode plate topology of alternative embodiments of the multilayer capacitors in FIGS. 4A-4E.

FIG. 5A is a diagrammatic presentation of opposite polarity electrode plates 54x, 55x viewed from above the capacitor 5 showing a standard parallel gap 59 arrangement. The opposing electrode plates 54x, 55x may occupy the same laminate body 53 interface seam 58x, as shown in FIG. 4D; or may occupy only alternate seams 58x as shown in FIG. 4E. FIG. 5B shows electrode plates 54x, 55x formed in such a way that the effective electrode area is curved in a lengthwise direction. The electrode plates 54x, 55x may also include rounding 50 to reduce the electric field concentration at electrode plate corners. As should be apparent from FIG. 5B, the length of the effective electrode area is extended by the curve as compared to the effective electrode area in FIG. 5A. Persons having ordinary skill in the art will understand that the electrode plates 54x, 55x may be printed on dielectric layers 53x in a nearly unlimited number of patterns. For example, FIG. 5C shows an embodiment of the invention having a set of electrode plates 54x, 55x with a meandering gap configured so that each electrode plate 54x, 55x extends lengthwise horizontally. FIG. 5D shows another embodiment where the electrode plates 54x, 55x have multiple lengthwise extensions 56x, 57x. FIG. 5E shows another embodiment of the invention where electrode plates 54x, 55x are curved back on each other in an interlocking pattern. FIG. 5F shows another embodiment on the invention where electrode plates 54x, 55x have a more angular pattern.

Although the electrode gap 59 may typically be kept about constant across the effective electrode area, it may also be desirable to vary the width of the gap 59 at different points along its length. For example, as shown in FIG. 5F, it may be desirable to make dimension d6 larger than d7 in order to compensate for electric field concentrations that may occur at points on the electrode plates 54x, 55x.

Figure 5G:
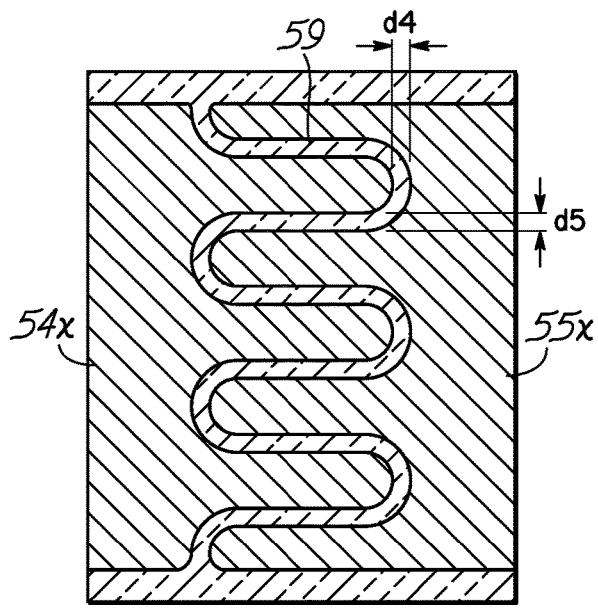
FIG. 5G is a diagrammatic top view of an electrode plate topology of alternative embodiments of the multilayer capacitors in FIGS. 4A-4E.
Figure 5H:
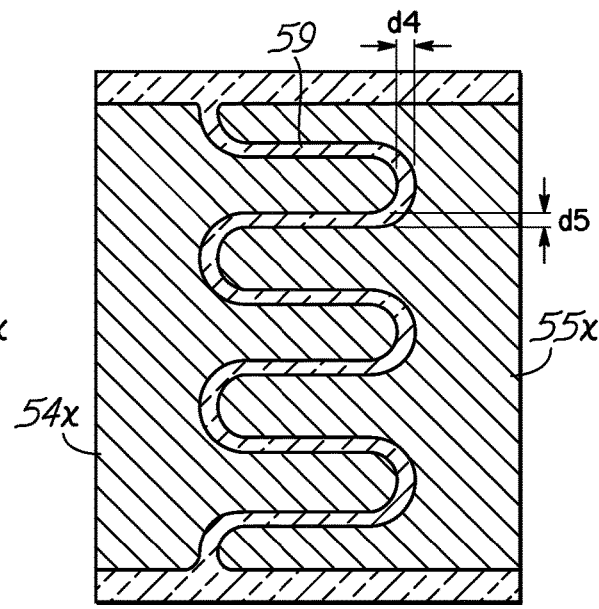
FIG. 5H is a diagrammatic top view of an electrode plate topology of alternative embodiments of the multilayer capacitors in FIGS. 4A-4E.
Figure 5I:
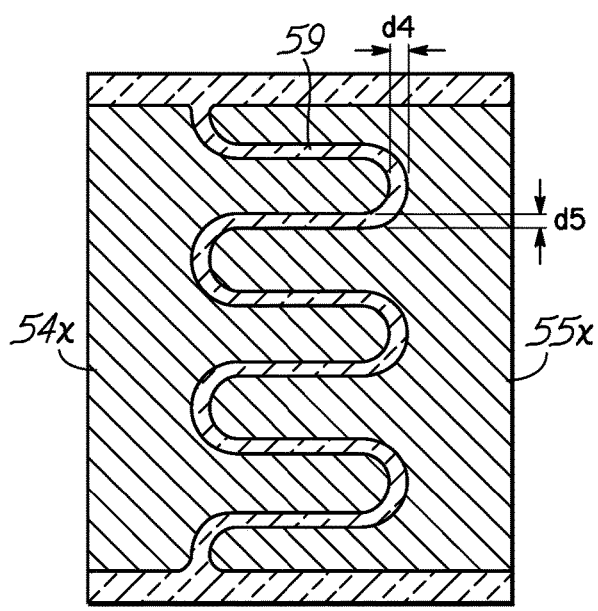
FIG. 5I is a diagrammatic top view of an electrode plate topology of alternative embodiments of the multilayer capacitors in FIGS. 4A-4E.
Figure 5J:
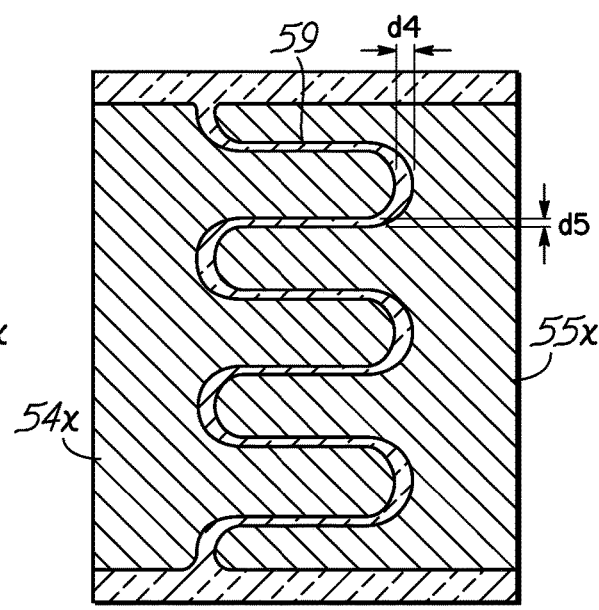
FIG. 5J is a diagrammatic top view of an electrode plate topology of alternative embodiments of the multilayer capacitors in FIGS. 4A-4E.

Another advantage that may be obtained by varying the width of the electrode gap 59 along its length is presented in FIGS. 5G-5J. The spacing d4, d5 of the gap 59, as shown in FIGS. 5C-5D, and 5G-5J, may be set differently in the x axis as compared to the y axis to accommodate incongruities in the capacitor fabrication process. In some capacitor fabrication processes, there may be differences in the tolerances achievable in the x and y axes. For example, in one embodiment of the invention employing an electrode plate 54x, 55x shape substantially as shown in FIGS. 5G-5J, the fabrication process tolerances may allow a minimum gap spacing d4 in the x-axis of about 3.0 mils. However, the same fabrication process may allow a minimum gap spacing d5 in the y-axis of about 1.0 mils. Therefore, if the electrode gap 59 is kept constant, the minimum gap spacing allowed in the x-axis will determine the minimum gap spacing for the entire electrode gap 59. FIG. 5G represents an electrode plate 54x, 55x configuration wherein the electrode gap 59 is kept approximately constant throughout its length. FIGS. 5H-5J represent electrode plate 54x, 55x configurations with a progressively reduced gap spacing d5 in the y-axis while maintaining gap spacing d4 as in FIG. 5G. Values measured for capacitors fabricated using varying electrode gaps 59 substantially as represented in FIGS. 5G-5J are presented in Table 1 below:

TABE 1

Measured Capacitor Electrical Characteristics verses Electrode Gap

| FIG. | d4 design spacing (mils) | d5 design spacing (mils) | Measured Capacitance (pF) | Capacitance Change | Voltage Breakdown (VDC) | Voltage Breakdown Change (relative to result of 5G) |
|---|---|---|---|---|---|---|
| 5G | 3.0 | 3.0 | 667 | 0% | 3534 | 0% |
| 5H | 3.0 | 2.0 | 1115 | +67% | 2739 | −22.5% |
| 5I | 3.0 | 1.5 | 1295 | +94% | 2785 | −21.2% |
| 5J | 3.0 | 1.0 | 1613 | +142% | 2604 | −26.3% |

As can be seen from the results in Table 1, reducing the electrode gap 59 width in the y-axis to take advantage of the tighter fabrication tolerances available in that direction may allow for significantly higher capacitance values with minimal impact on capacitor breakdown voltage.

It will be understood by persons having ordinary skill in the art that numerous shapes might be employed to affect the performance of the capacitors 5, 6 depending on the intended application, including using differently shaped electrode plates 54x, 55x at different laminate body 53 layers so as to create a gap 59 that is non-planar in a vertical direction as well as a horizontal direction. The concept of using of differently shaped electrode plates at different laminate body layers may also be applied to capacitors having partially or fully overlapping plates, and is not limited to capacitors relying solely on fringe effect capacitances.

Figure 1A:
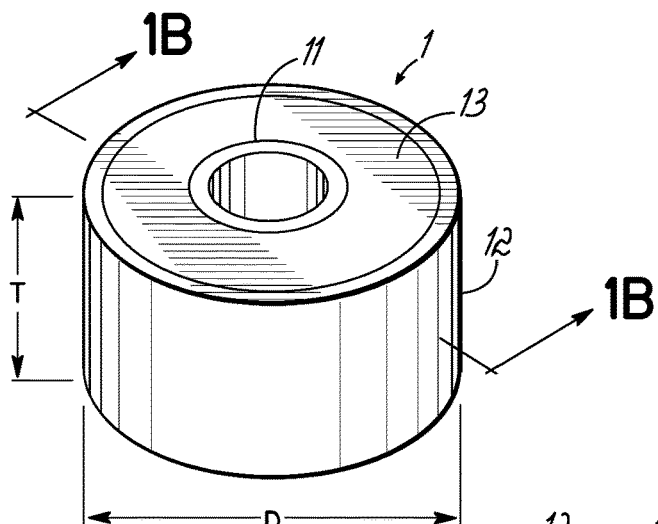
FIG. 1A is a diagrammatic perspective view showing a known laminated discoidal feed-through ceramic filter capacitor.
Figure 1B:
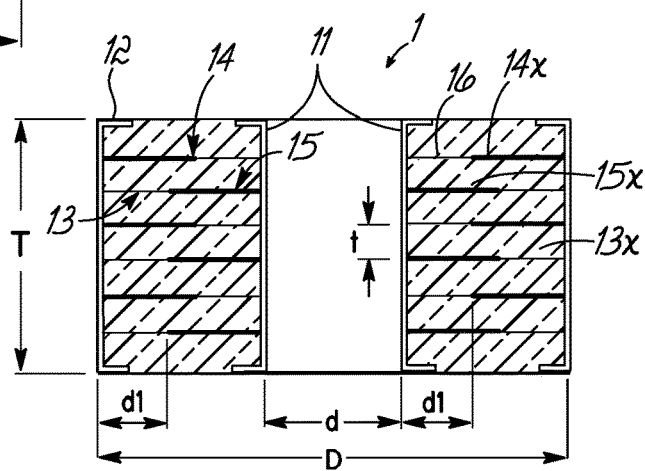
FIG. 1B is a centerline cross-sectional view taken along line 1 B-1 B of FIG. 1A illustrating the internal electrode structure of the discoidal feed-through ceramic filter capacitor of FIG. 1A.
Figure 2A:
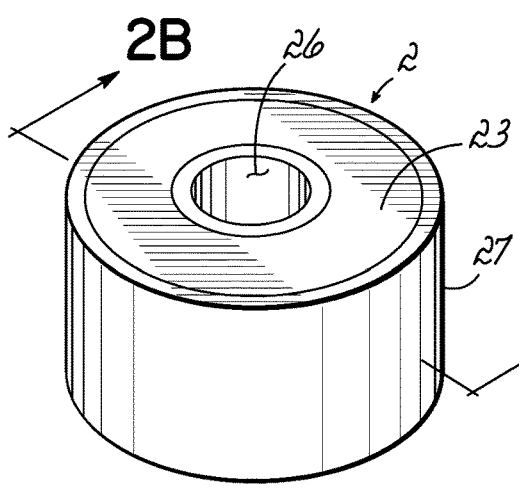
FIG. 2A is a diagrammatic perspective view showing a known laminated discoidal feed-through ceramic filter capacitor employing a non-overlapping electrode structure.
Figure 2B:
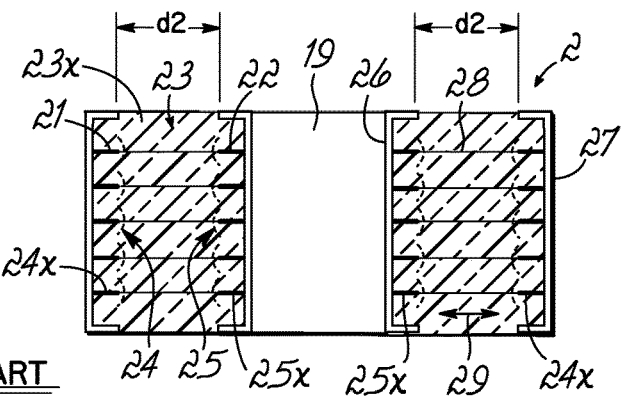
FIG. 2B is a centerline cross-sectional view taken along line 2 B-2 B. of FIG. 2A illustrating the internal electrode structure of the discoidal feed-through ceramic filter capacitor of FIG. 2A.
Figure 2C:
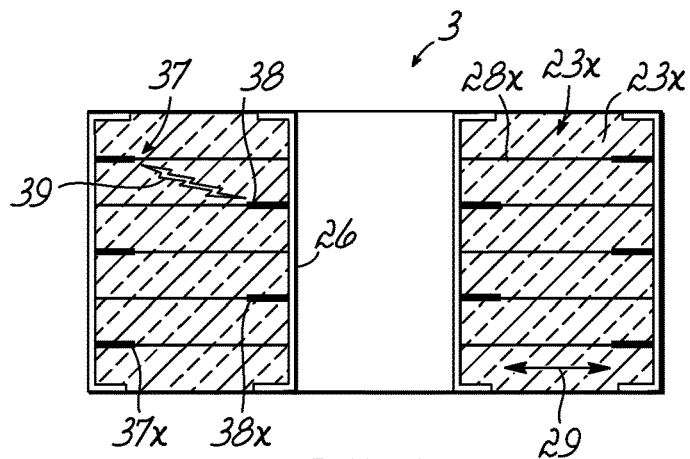
FIG. 2C is another centerline cross-sectional view illustrating an alternative internal electrode structure for the discoidal feed-through ceramic filter capacitor of FIG. 2A.
Figure 6A:
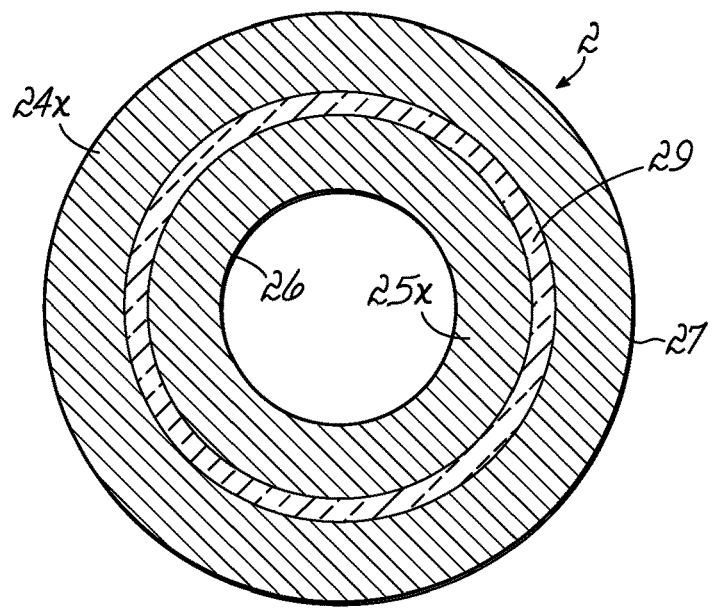
FIG. 6A is a diagrammatic top view of an electrode plate topology of a known multilayer capacitor in FIGS. 2A-2C.

FIGS. 6A-6D are diagrammatic views illustrating embodiments of the invention in the form of electrode plate shapes for multilayer discoidal capacitors similar to those in FIGS. 2B-2C. Because the effective electrode areas of capacitors 2, 3 have a vertical (or axial) dimension similar to effective electrode areas of capacitors 5, 6, the effective electrode areas of capacitors 2, 3 may also be increased in a manner similar to that shown in FIGS. 5A-5F by varying the radii of the electrode plates 24x, 25x at various points along their electrode gap 29. FIG. 6A shows concentric opposing electrode plates 24x, 25x viewed from above the capacitors 2, 3 which results in a known concentric gap 29 arrangement. Although the gap 29 is shown essentially centered between the inner electrode 26, and outer electrode 27, the actual position of the gap may be at any radius within the laminate body 23 of the capacitors 2, 3.

Figure 6B:
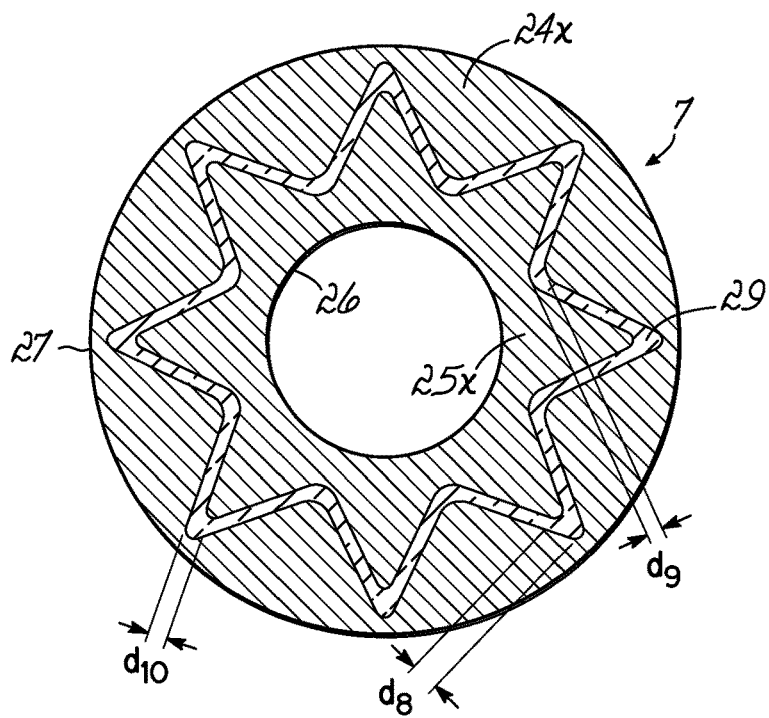
FIG. 6B is a diagrammatic top view of an electrode plate topology of an alternate embodiment of the multilayer capacitor in FIGS. 2A-2C.
Figure 6C:
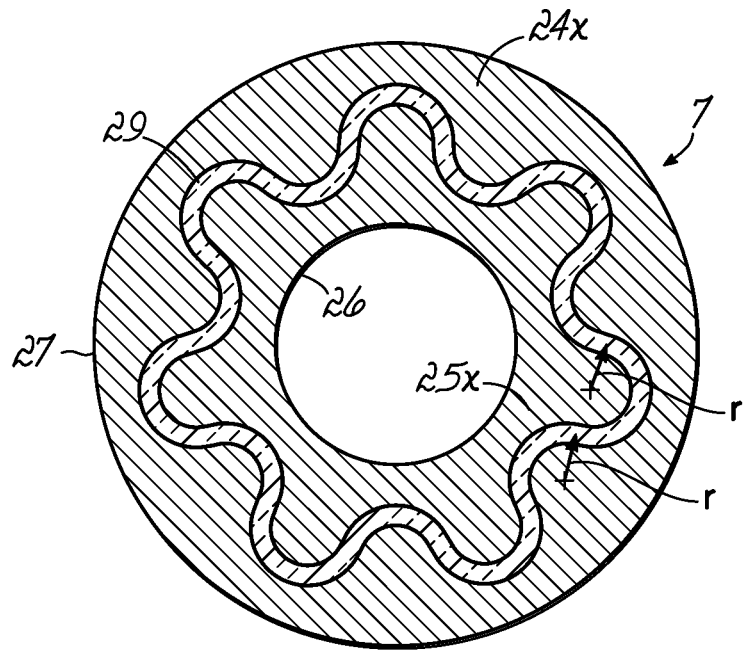
FIG. 6C is a diagrammatic top view of an electrode plate topology of an alternate embodiment of the multilayer capacitor in FIGS. 2A-2C.
Figure 6D:
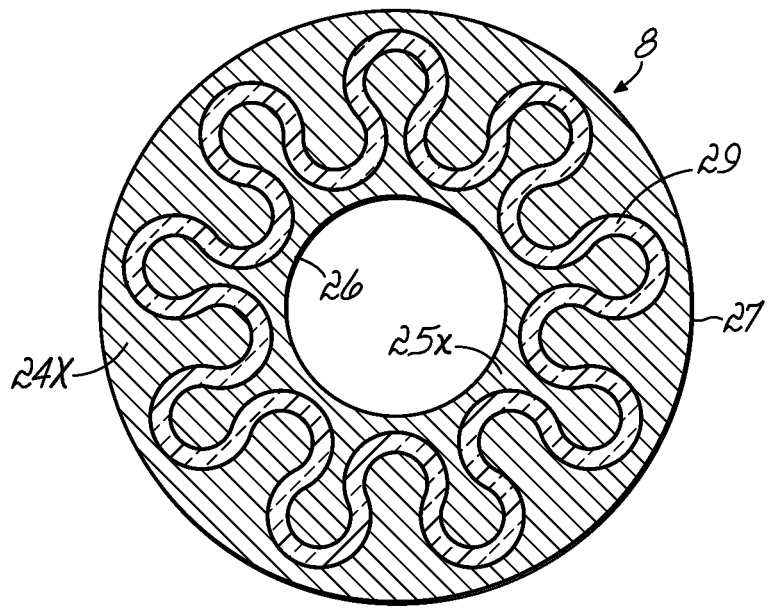
FIG. 6D is a diagrammatic top view of an electrode plate topology of an alternate embodiment of the multilayer capacitor in FIGS. 2A-2C.

For purposes of clarity, from here on, the reference numbers used to describe the capacitors embodied in FIGS. 6B-6D are limited to those used to describe the elements of capacitor 2 in FIGS. 2A-2B. However, it is understood that the same embodiments apply equally to the alternating electrode plate arrangement in capacitor 3 shown in FIG. 2C. Referring to FIG. 6B, the radius of electrode plates 24x, 25x may be varied at different angular positions about the axis of capacitor 7, forming a pattern resembling a star. By causing the gap 29 to meander as it circumnavigates the laminate body 23 of the capacitor 7, the effective electrode area of the capacitor 7 is increased. As with the chip capacitors 5, 6, the electrode plates 24x, 25x may be printed on the dielectric layers 23x in a nearly unlimited number of patterns. FIG. 6C shows a set of electrode plates 24x, 25x with a meandering gap 29 configured so that the gap 29 has a curve with an approximately constant radius. FIG. 6D shows another embodiment of the invention where electrode plates 24x, 25x are curved back on each other in an interlocking pattern.

Although the electrode gap 29 width may typically be kept constant across the effective electrode area, the gap 29 width may also be varied across the effective electrode area in such a way as to compensate for how the electrode plate 24x, 25x shape may affect local electrostatic field strengths, or to accommodate incongruities in the capacitor fabrication process. For example, in FIG. 6B, d8 and d9 may be made larger than d10, and d8 may also have a different dimension than d9, in order to compensate for electric field concentration that may occur at points on the electrode plates 24x, 25x. It will be understood by persons having ordinary skill in the art that numerous shapes might be employed to affect the performance of the capacitor 7 depending on the intended application, including using differently shaped electrode plates 24x, 25x at different laminate body 23 layers so as to create a gap that meanders in a vertical (or axial) direction as well as in an azimuthal or radial direction. As with the chip capacitors, the concept of using of differently shaped electrode plates at different laminate body layers may also be applied to discoidal capacitors having partially or fully overlapping plates, and is not limited to capacitors relying solely on fringe effect capacitances.

FIGS. 7A-7B and 8A-8D illustrate another embodiment of the invention that includes electrode plates external to the dielectric body 53 of capacitors 9, 10. The external electrode plates 93-96, 102-105 form an integrated capacitive element in parallel with the main capacitor formed by internal electrodes 54, 55, 64, 65. Because the external electrode plates 93-96, 102-105 may be made relatively thicker than the internal electrode plates 54x, 55x, 64x, 65x, the external electrode plates 93-96, 102-105 may offer a relatively lower equivalent series inductance and resistance than the internal electrode plates 54x, 55x, 64x, 65x. The capacitor formed by external electrode plates 93-96, 102-105 may therefore have a higher resonant frequency than the capacitor formed by internal electrodes 54, 55, 64, 65. Thus, the parallel capacitances added by external electrode plates 93-96, 102-105 may—in addition to increasing the total capacitive value of the capacitors 9, 10—also provide a supplemental, low impedance, high frequency capacitance section that may increase the useful bandwidth of the capacitors 9, 10.

Figure 7A:
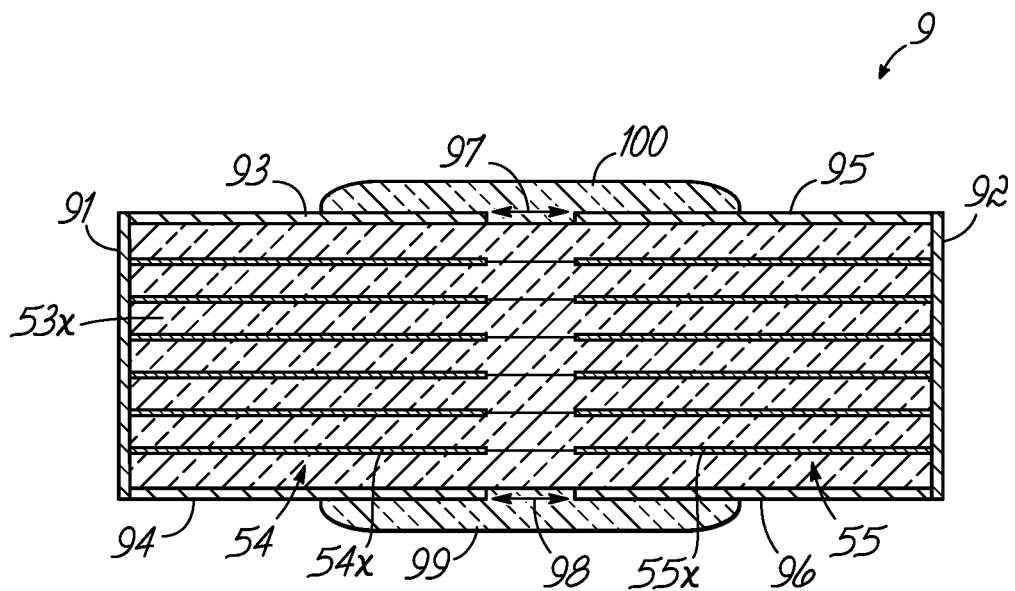
FIG. 7A is a cross-sectional view of an alternative embodiment of the multilayer capacitor in FIGS. 4A-4E with additional external electrode plates.
Figure 7B:
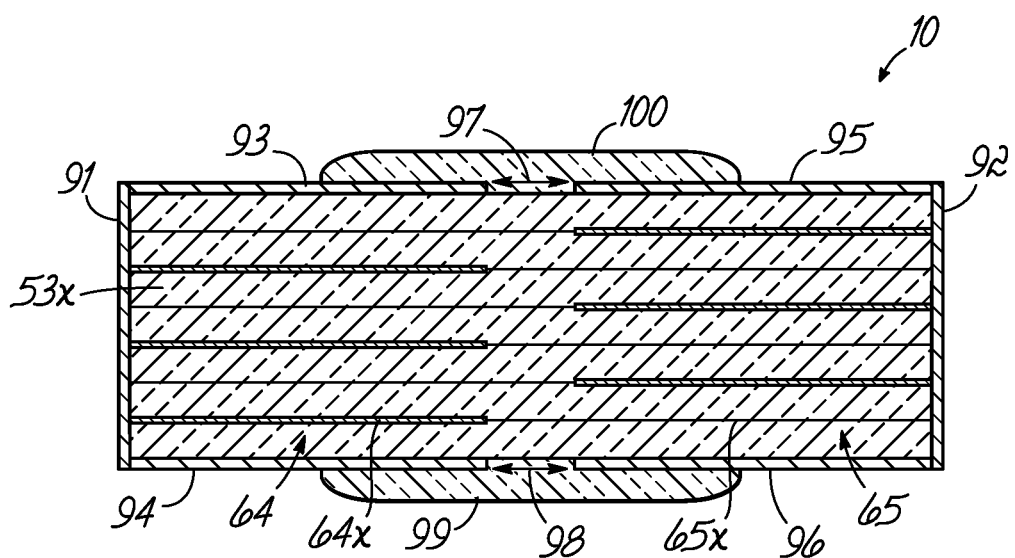
FIG. 7B is a cross-sectional view of an alternative embodiment of the multilayer capacitor in FIG. 7A.

Referring now to FIGS. 7A-7B, which are diagrams illustrating cross-sectional views of the capacitors 9, 10, internal electrode plates 54x, 55x, 64x, 65x are electrically connected to their respective capacitor terminals 91, 92. External electrode plates 93, 94 extend over respective upper and lower surfaces of capacitors 9, 10, and are electrically connected to terminal 91. Similarly, external electrode plates 95, 96 extend over respective upper and lower surfaces of the capacitors 9, 10 and are electrically connected to terminal 92. The electrode plates 93, 95 are configured on the upper surface of the capacitors 9, 10 so that a gap 97 is formed between the ends of the electrode plates 93, 95, the gap 97 being sufficiently narrow so as to provide a fringe-effect capacitance. In a similar manner, a fringe-effect capacitance is also provided by a gap 98 formed by external electrodes 94, 96 on the lower side of the capacitors 9, 10.

In order to increase the breakdown voltage and capacitance between the external electrode plates 93-96, a dielectric coating or material 99, 100 may be provided to cover the gaps 97, 98. The dielectric material 99, 100 may be a high temperature fired insulator such as a glass, a ceramic, or the like; or a low temperature curing material such as epoxy, silicone, a polymer, or the like. Although as shown in FIGS. 7A and 7B, the dielectric material 99, 100 covers about half of the capacitor surface to which it is applied, it should be understood that in alternative embodiments of the invention, the dielectric material 99, 100 may cover less of the corresponding surface of the capacitor 9, 10, or may cover substantially all of the corresponding surface. In alternative embodiments, depending on the size of the gap between the ends of respective external electrode plates 93-96, the desired breakdown voltage of the capacitor 9, 10, and other external factors, the dielectric material 99, 100 may be omitted. In yet another embodiment of the invention, the exterior surface of the capacitor 9, 10 may include an insulating coating (not shown) applied so as to provide an electrical barrier to prevent the external electrically conductive parts of the capacitor 9, 10 from shorting or arcing to other devices or traces when mounted on a circuit board. The insulating coating may be substantially similar to the insulating material 99, 100, or it may be produced by an oxidation process or anodizing process of the underlying electrically conductive terminal 91, 92 material or external electrode plate 93-96, 102-105 material (which in may be the same material as the terminal 91, 92 material), as the case may be.

Figure 8A:
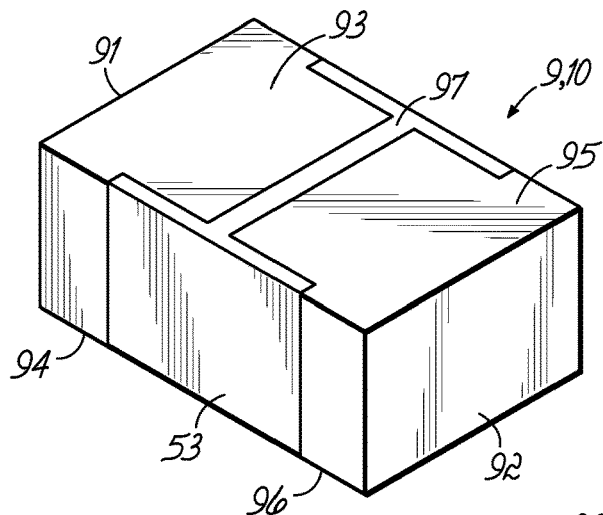
FIG. 8A is a diagrammatic perspective view showing an embodiment of a multilayer chip capacitor employing the external electrode structure in FIGS. 7A and 7B.
Figure 8B:
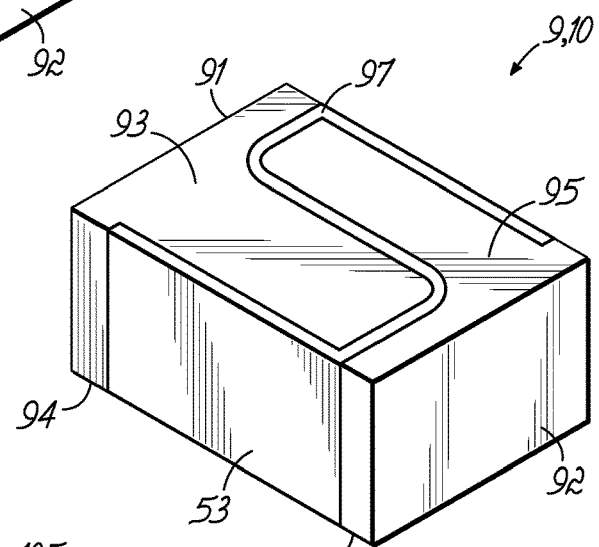
FIG. 8B is a diagrammatic perspective view showing an alternative embodiment of a multilayer chip capacitor employing the external electrode structure in FIGS. 7A and 7B.

FIGS. 8A-8B are perspective views illustrating various exemplary embodiments of the capacitors 9, 10 as described in FIGS. 7A-7B. Typically, the external electrode plates 93-96 (electrode plates 94 and 96 are not visible) may have a shape conforming to their respective internal electrode plates 54x, 55x, 64x, 65x, so as to avoid overlapping electrode plates 54x, 55x, 64x, 65x that are electrically connected to terminals 91, 92 of opposite polarity. For example, FIG. 8A illustrates a capacitor 9, 10 with external electrode plates 93 and 95 shown configured to match an internal electrode plate 54x, 55x, 64x, 65x shape that may be similar to that shown in FIG. 5A. Similarly, FIG. 8B illustrates a capacitor 9, 10 with external electrode plates 93, 95 shown configured to match an internal electrode plate 54x, 55x, 64x, 65x shape that may be similar to that shown in FIG. 5C. In other embodiments of the invention, the external plates 93-96 may be allowed to overlap internal electrode plates 54x, 55x, 64x, 65x to varying extents, particularly in cases where the plane of the external electrode plate would be orthogonal to the plane of the internal electrode plate, and thus the capacitance formed between the internal and external plates would be primarily in the form of a fringe capacitance.

Figure 8C:
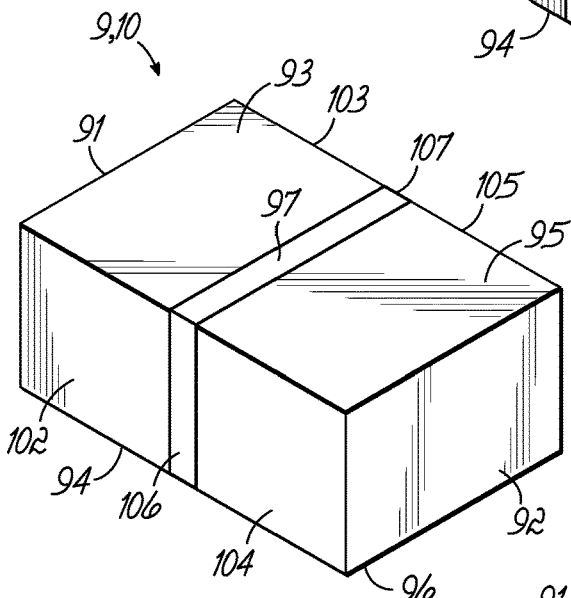
FIG. 8C is a diagrammatic perspective view showing an alternative embodiment of the multilayer chip capacitor in FIG. 8A employing additional vertical external electrodes.
Figure 8D:
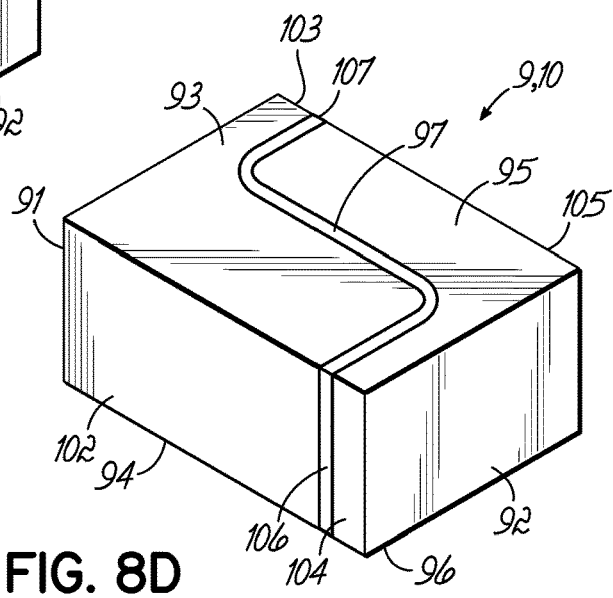
FIG. 8D is a diagrammatic perspective view showing an alternative embodiment of the multilayer chip capacitor in FIG. 8B employing additional vertical external electrodes.

FIGS. 8C-8D are perspective views illustrating another embodiment of the invention wherein the capacitor 9, 10 includes additional external electrode plates 102-105 (electrode plates 103 and 105 are not visible) on the vertical sides of the laminate body 53. External electrode plates 102, 103, extend over respective front and back vertical surfaces of the capacitor 9, 10, and are electrically connected to terminal 91. Similarly, external electrode plates 104, 105 extend over respective front and back vertical surfaces of the capacitor 9, 10, and are electrically connected to terminal 92. The electrode plates 102, 104 are configured on the front vertical surface of the capacitor 9, 10, so that a gap 106 between the ends of the external electrode plates 102, 104 is produced that may be sufficiently narrow so as to provide a fringe-effect capacitance. Similarly, the electrode plates 103, 105 may be configured on the back vertical surface of the capacitors 9, 10 so that a gap 107 (not visible) between the ends of the external electrode plates 103, 105 may be produced that is sufficiently narrow so as to provide a fringe-effect capacitance.

In order to increase the breakdown voltage and capacitance between the external electrode plates 93-96, 102-105, a dielectric coating or material (not shown) may be provided to cover the gaps 97, 98, 106, 107 in a manner substantially identical to how the dielectric coating or material is applied to the horizontal external electrodes 93-96 as discussed previously. In alternative embodiments, depending on the size of the gap between the ends of respective external electrode plates 93-96, 102-105, the desired breakdown voltage of the capacitor 9, 10, and other external factors, the dielectric material may be omitted. In yet another embodiment of the invention, the exterior surfaces of the capacitor 9, 10 may include an insulating coating (not shown) applied so as to provide an electrical barrier to prevent the conductive parts of the capacitor 9, 10 from shorting or arcing to other devices or traces when mounted on a circuit board. The insulating coating may be substantially similar to the insulating material used to fill the gaps 97, 98, 106, 107, or it may be produced by an oxidation process or anodizing process of the underlying electrically conductive terminal 91-92 material or external electrode plate 93-96, 102-105 material (which in may be the same material as the terminal 91, 92 material), as the case may be.

Typically, the vertical external electrode plates 102-105 will be shaped so that they are confined to areas adjacent to their respective internal electrode plates 54x, 55x, 64x, 65x so as to avoid being immediately adjacent to electrode plates 54x, 55x, 64x, 65x connected to terminals 91, 92 having an opposite polarity. For example, FIG. 8C illustrates a capacitor 9, 10 with external electrode plates 93 and 95 shown configured to match an internal electrode plate 54x, 55x, 64x, 65x shape that may be similar to that shown in FIG. 5A. As illustrated, vertical external electrode plates 102-105 are only immediately adjacent to internal electrode plates 54x, 55x, 64x, 65x that may be electrically connected to the same respective terminals 91, 92. Similarly, FIG. 8D illustrates a capacitor 9, 10 with external electrode plates 93 and 95 shown configured to match an internal electrode plate 54x, 55x, 64x, 65x shape that may be similar to that shown in FIG. 5C. In a similar manner, vertical external electrode plates 102-105 are only immediately adjacent to internal electrode plates 54x, 55x, 64x, 65x that may be electrically connected to the same respective terminals 91, 92. In other embodiments of the invention, the vertical external plates 102-105 may be allowed to overlap opposite polarity internal electrode plates 54x, 55x, 64x, 65x to varying extents, particularly in cases where the plane of the external electrode plate would be orthogonal to the plane of the internal electrode plate, and thus the capacitance formed between the internal and external plates would be primarily in the form of a fringe capacitance.

Figure 9A:
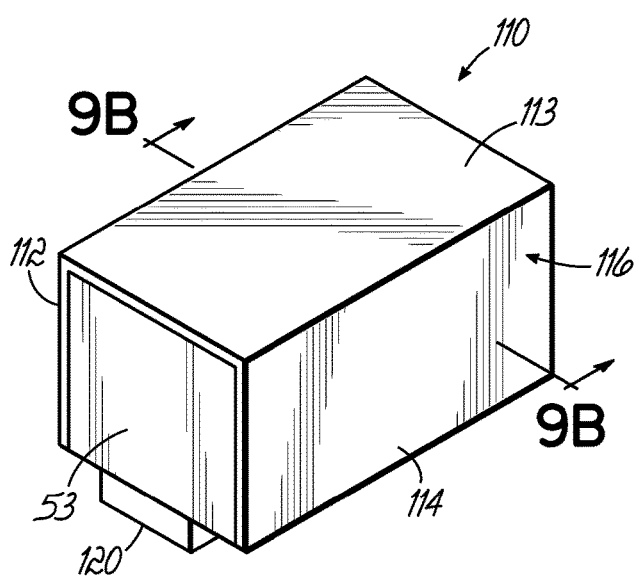
FIG. 9A is a diagrammatic perspective view showing an embodiment of a multilayer chip capacitor having an alternate topology to that seen in FIGS. 6B-6D.
Figure 9B:
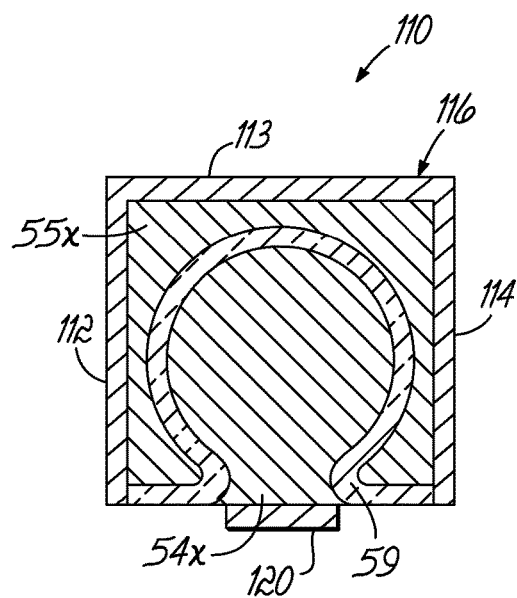
FIG. 9B is a cross sectional view of the alternative embodiment of the multilayer capacitor in FIG. 9A.

Referring now to FIGS. 9A and 9B, in which like reference numerals refer to like features in FIGS. 7A and 7B, and in accordance with another embodiment of the invention, capacitor 110 is illustrated including terminal plates 112-114 on the top and sides of the capacitor 110 forming a first terminal 116, a laminate body 53, electrode plates 54x, 55x, and a second terminal 120. In a similar fashion as capacitors 9-10, the laminate body 53 includes electrode plates 54x, 55x disposed between dielectric layers 53x. Electrode plates 54x are electrically coupled to terminal 120, forming electrode 54. Likewise, electrode plates 55x are electrically coupled to terminal 116, forming electrode 55. Electrodes 54, 55 are formed from a plurality of adjacent electrode plates 54x, 55x, disposed between the dielectric layers 53x so that a gap 59 separates electrodes 54, 55, forming a fringe capacitance between the electrodes 54, 55. The electrode plates 54x, 55x may be on either alternating layers or adjacent layers, as previously described with reference to FIGS. 4D and 4E. Referring now to FIG. 9B, the electrode plates 55x extend to the surface on three sides of the capacitor 110 so that they may be electrically coupled to terminal plates 112-114. The electrode plates 54x extend to a portion of the bottom surface of the capacitor 110 so that they may be electrically coupled to terminal 120 without shorting to terminal 116.

Figure 10A:
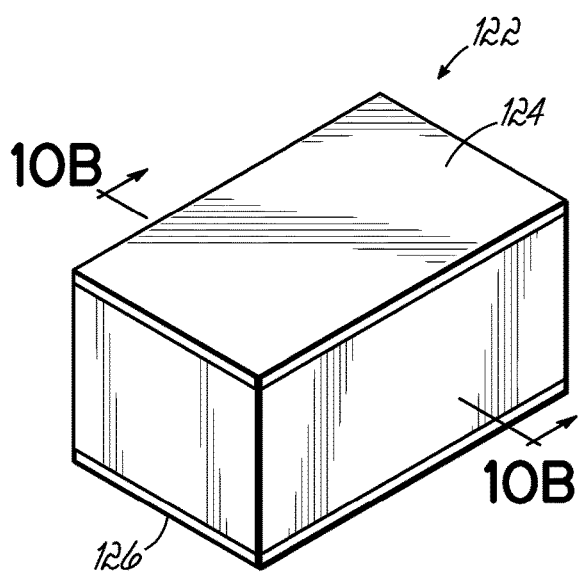
FIG. 10A is a diagrammatic perspective view showing an embodiment of a multilayer chip capacitor having another alternate topology to that seen in FIGS. 6B-6D.
Figure 10B:
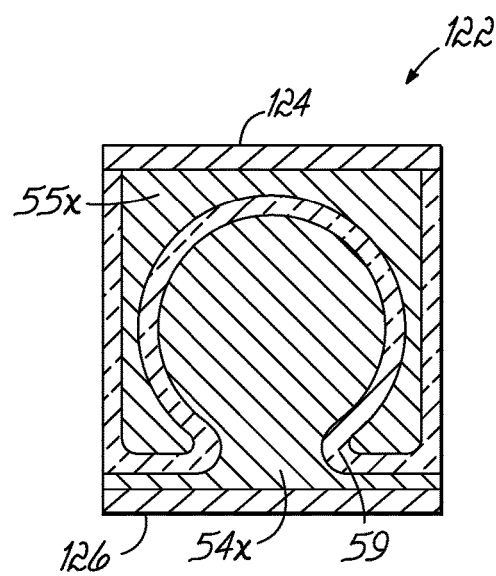
FIG. 10B is a is a cross sectional view of the alternative embodiment of the multilayer capacitor in FIG. 10A.

Referring now to FIGS. 10A and 10B, in which like reference numerals refer to like features in FIGS. 9A and 9B, and in accordance with another embodiment of the invention, capacitor 122 is illustrated including a first terminal 124 on the top of the capacitor 122, a laminate body 53, electrode plates 54x, 55x, and a second terminal 126. The construction of capacitor 122 is similar to capacitor 110 with the following modifications: (1) terminal 124 does not include terminal plates on the sides of the capacitor; (2) terminal 126 extends across the entire bottom surface of capacitor 122, and (3) the electrode plates 55x forming electrode 55 are recessed from the sides of the laminate body 53. The laminate body 53 includes electrode plates 54x, 55x disposed between dielectric layers 53x. Electrode plates 54x are electrically coupled to terminal 126, which extends across the bottom of the capacitor 122, forming electrode 54. Likewise, electrode plates 55x are electrically coupled to terminal 124, forming electrode 55. Electrodes 54, 55 are formed from a plurality of adjacent electrode plates 54x, 55x, disposed between the dielectric layers 53x so that a gap 59 separates electrodes 54, 55, forming a fringe capacitance between the electrodes 54, 55. The electrode plates 54x, 55x may be on either alternating layers or adjacent layers, as previously described with reference to FIGS. 4D and 4E.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising".

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A chip capacitor comprising:
a laminate body comprising a plurality of dielectric layers and forming a substantially parallelepiped shape;
a plurality of first electrically conductive layers forming a first electrode;
a plurality of second electrically conductive layers forming a second electrode;
wherein the first and second electrically conductive layers are positioned upon one or more of the dielectric layers forming the laminate body;
a first terminal comprised of an electrically conductive layer deposed substantially on a first surface of the laminate body, wherein the first terminal is electrically connected to the first electrode;
a second terminal comprised of an electrically conductive layer deposed substantially on a second surface of the laminate body, wherein the second terminal is electrically connected to the second electrode; and
wherein the first electrically conductive layers do not overlap the second electrically conductive layers, so that a gap is formed between the first and second electrodes producing a fringe-effect capacitance between the first and second electrodes;
wherein the first and second electrodes are configured so that the gap does not maintain a uniform distance from either the first or second surfaces and has a curved shape; and
wherein the first surface and second surface are on substantially opposite sides of the laminate body.

2. The chip capacitor of claim 1, wherein the first electrode and the second electrode are further configured in such a way that the gap has a zig zag shape.

3. The chip capacitor of claim 2, wherein the first electrode and the second electrode are further configured in such a way that the gap does not have a constant width.

4. The chip capacitor of claim 1, wherein each of the first electrically conductive layers is separated from each of the second electrically conductive layers by a least one of the plurality of dielectric layers.

5. The chip capacitor of claim 1, further comprising:
a third electrode including an electrically conductive layer deposed substantially on a third surface of the laminate body;
a fourth electrode including an electrically conductive layer disposed substantially on the third surface of the laminate body;
wherein the third electrode is electrically connected to the first terminal, the fourth electrode is electrically connected to the second terminal, and the third and fourth electrodes are further configured in such a way that a capacitor is formed between the third and fourth electrodes primarily from a fringe-effect capacitance between the third and fourth electrodes.

6. The chip capacitor of claim 5, further comprising:
a dielectric material interposed between the third and fourth electrodes.

7. The chip capacitor of claim 5, wherein the capacitor has an exterior, further comprising:
an insulating coating applied to the exterior of the capacitor in such a way as to provide an electrical barrier between the capacitor and other devices or traces when mounted on a circuit board.

8. The chip capacitor of claim 1 wherein the dielectric comprises a ceramic material.

9. A capacitor comprising:
a laminate body including a plurality of dielectric layers;
a plurality of first electrically conductive layers forming a first electrode;
a plurality of second electrically conductive layers forming a second electrode;
wherein the first and second electrically conductive layers are positioned upon one or more of the dielectric layers forming the laminate body;
wherein the layers of the first electrode and second electrode do not overlap and are configured so that a gap is formed between the electrodes, wherein the gap forms a fringe capacitance between the first electrode and the second electrode; and
wherein the surface contour defined by the gap has a curved shape and does not conform to the shape of an exterior surface of the capacitor.

10. The capacitor of claim 9 where the capacitor is a chip capacitor further comprising:
an electrically conductive first terminal deposed substantially on a first surface of the laminate body, wherein the first terminal is electrically connected to the first electrode;
an electrically conductive second terminal deposed substantially on a second surface of the laminate body opposite the first surface, wherein the second terminal is electrically connected to the second electrode.

11. The capacitor of claim 10, further comprising:
a third electrode including an electrically conductive layer deposed on a third surface of the laminate body;
a fourth electrode including an electrically conductive layer disposed on the third surface of the laminate body;
wherein the third electrode is electrically connected to the first terminal, the fourth electrode is electrically connected to the second terminal, and the third and fourth electrodes are further configured in such a way that a capacitor is formed between the third and fourth electrodes primarily from a fringe-effect capacitance between the third and fourth electrodes.

12. The multilayer capacitor of claim 11, further comprising:
   a dielectric material interposed between the third and fourth electrodes.

13. The multilayer capacitor of claim 12, further comprising:
   a dielectric coating on the external surfaces of the first electrically conductive terminal, the second electrically conductive terminal, the third electrode, and the fourth electrode; the dielectric coating configured in such a way so as to provide an electrical barrier to prevent shorting or arcing to other devices or traces when the multilayer capacitor is mounted on a circuit board.

14. The capacitor of claim 9 where the capacitor is a discoidal feed-through capacitor.

15. The capacitor of claim 9 where the dielectric material is ceramic.

* * * * *